Feb. 20, 1968     E. W. JENSEN     3,369,765

WEB TRANSPORT SYSTEM

Filed June 6, 1966

EINAR W. JENSEN
INVENTOR.

BY *Paul R. Holmes*
*Robert R. Candall*

ATTORNEYS

United States Patent Office 3,369,765
Patented Feb. 20, 1968.

3,369,765
WEB TRANSPORT SYSTEM
Einar W. Jensen, Rochester, N.Y., assignor to Eastman Kodak Company, Rochester, N.Y., a corporation of New Jersey
Filed June 6, 1966, Ser. No. 555,361
5 Claims. (Cl. 242—55.01)

This invention relates generally to a web transport and tension control mechanism, and more specifically to a film tension control mechanism for a film drive system used in a photographic processing machine.

In film processing, it is the usual practice to run the film in a continuous length through a series of tanks containing processing solutions, rinse solutions, fixing solutions and wash solutions and then to run it through one or more drying cabinets or chambers. A series of film support spools is provided at the top and the bottom of the tanks and the drying cabinets so that the film forms a multiplicity of loops in passing through each tank and through the drying cabinet. The film may be driven by sprocket wheels located at suitably spaced distances, by driven pacer rolls which pull the film through the processor or through a section of the processor, or by the frictional engagement of the film with the support spools, some of which may be driven, or by a combination of any of these means.

As is well known in the art, the film, as it becomes wet in processing, swells and stretches and subsequently, as it is dried, shrinks to approximately its original size. Since the film must be kept under proper tension, especially in friction drive processors, the support spools must accommodate the variations in film size, and the resulting changes in film tension, as it passes through the tanks. Such tension regulating means must accommodate the stretching and shrinking of the film and generally includes means for enlarging and reducing the size of the film loops or some of the loops which the film forms as it is wound about the various support spools.

One system for accomplishing this has been to arrange either or both the top and bottom support spools for motion toward each other so as to vary the film loop length therebetween. This motion is generally controlled by biasing means such as weights or springs. However, such arrangements tend to increase the bulk of the processing machines. Furthermore, these arrangements generally require that the force of the weights or spring means be imposed upon the film so that the film may be mechanically stretched by the biasing means while it is wet, thus distorting the images and the sound track carried on the film.

Moreover, as the length of film passing through the processor is significantly increased, as is often desirable in present high capacity processing machines, the friction developed by the support spools may become too great to be overcome by driving only selected spools or by using a pacer roll at the end of each section. Furthermore, as the size of the film being processed is reduced, while the speed of processing is at the same time increased, the film tension must maintained within closer limits than has heretofore been necessary. Otherwise, the film may not be driven or it may be stretched so tightly as to break, resulting in costly machine shutdown and processing delays.

As taught in copending application, Ser. No. 555,362, filed June 6, 1966, one or more of the support spools may be deflected by the tension of the film so that, when the film tension reaches a predetermined value, it deflects the support spool into engagement with a drive roller operated at a speed slightly greater than the normal speed of the film. The drive roller increases the speed of the support spool and thus helps reduce the film tension. One of the disadvantages of the system disclosed in the copending application is the increased complexity of construction, requiring separate shafts for the film support spools and for the drive roller.

Accordingly, the present invention provides an improved film tension control mechanism that is of simple design and construction, thoroughly reliable and efficient in operation, and economical to manufacture.

Furthermore, the present invention provides an improved film tension mechanism that eliminates the need for separate shafts for the film support spools and the drive roller.

The present invention thus includes a web transport system comprising a shaft having a drive member mounted thereon and a web support spool arranged for rotation about the shaft. The support spool comprises a substantialy rigid central hub portion disposed substantially coaxial with the shaft and arranged to rotate thereabout adjacent the drive member. A substantially rigid constant diameter rim portion is disposed about and has a larger diameter than the hub and is connected thereto by at least one flexible member so that the rim portion may rotate about the shaft at varying radial distances. The drive member is disposed substantially in alignment with but not normally contacting the web support spool whereby the support spool rotates independently of the shaft and drive member until the rim portion is deflected into contact with the drive member by increased tension in the web passing hereover.

The various features of novelty which characterize the present invention are pointed out with particularity in the claims annexed to and forming a part of this specification. For better understanding of the invention, its operating advantages and specific objects attained by its use, reference should be had to the accompanying drawings and descriptive matter in which the preferred embodiment of the invention is illustrated and described.

Figure 1:
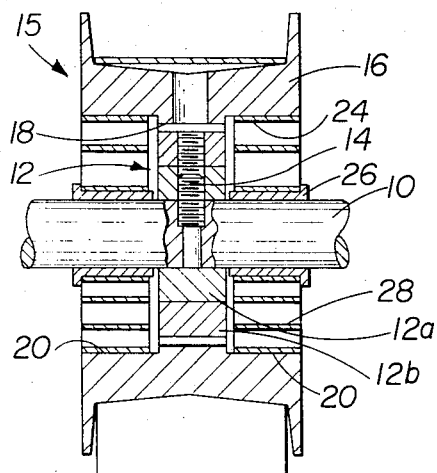
FIG. 1 is a front elevation view of a section of one embodiment of the film tension control mechanism of this invention.
Figure 2:
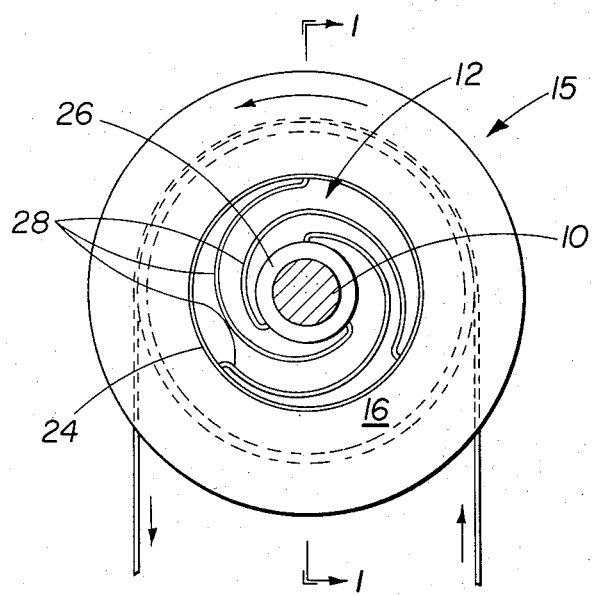
FIG. 2 is a side elevation view of FIG. 1.
Figure 5:
FIG. 5 is a schematic illustration of a portion of a photographic processor incorporating the present invention.

Referring to the embodiment of FIGS. 1 and 2, a drive shaft 10 is provided which is connected to any suitable drive mechanism, not shown. The drive shaft may be located in either the upper or lower portion, or in both, of a processing tank 11 (FIG. 5) or dryer for supporting a plurality of film support spools 15, only one of which is shown, in a manner well known in the art. The film is threaded over the spools to form a multiplicity of loops within the tank as shown in U.S. Patent 1,891,225 issued to R. G. Fear on Dec. 20, 1932. A drive member or roller 12 comprising a pair of concentric, annular rings 12a and 12b, is secured to the drive shaft 10, as by set screw 14 or the like. The outer ring 12b may be formed of a high friction material such as rubber. A film support spool 15 having a substantially rigid constant diameter rim portion 16 is mounted on the drive shaft 10 by a substantially rigid central hub portion 26 loosely surrounding the shaft and arranged to permit the rotation of the shaft without rotating the spool rim 16. The inner periphery 18 of rim 16 encircles the drive roller 12 and has a diameter slightly greater than the outer diameter of the drive member 12 so that the inner surface of the rim does not normally contact the drive roller. The rim may be integrally connected to the hub portion 26 by generally spiral shaped flexible spring-like members 28. Alternatively, the spool rim 16 may be provided with one or more annular recesses 20 along its inner periphery to form seats for the spiral springs, which would then have an outer rim 24 and an inner rim 26 interconnected by the flexible, generally spiral shaped members 28. As illustrated, the flexible members 28 may be involute in shape permitting the spool to absorb a certain amount of angular displacement without stressing the film. The outer rim 24 would be pressed into the recess 20 of the spool rim 16, and the inner rim 26 would loosely surround the drive shaft 10 so that there would be no driving connection therebetween.

Figure 3:
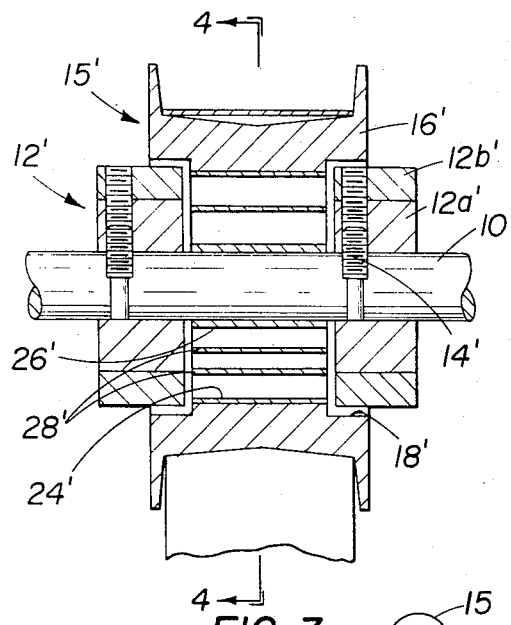
FIG. 3 is a view similar to FIG. 1 showing an alternate embodiment of this invention.
Figure 4:
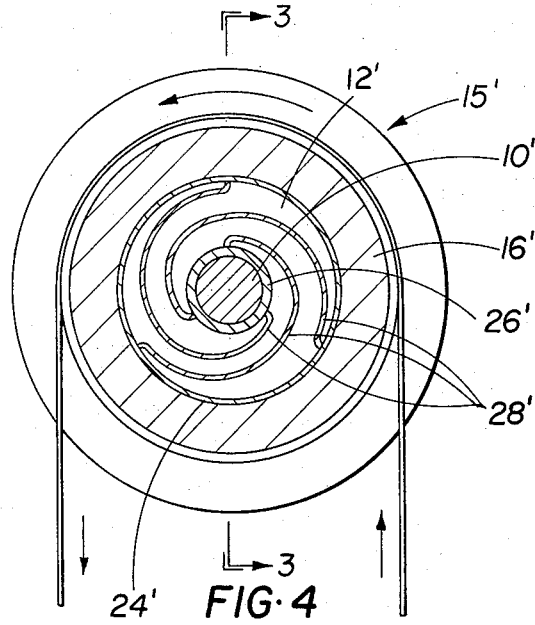
FIG. 4 is a side elevation view of the structure as taken along line 4—4 of FIG. 3.

In the alternate embodiment of the invention shown in FIGS. 3 and 4, parts similar to the parts shown in FIGS. 1 and 2 are indicated by the same numeral primed. The essential difference between this embodiment and the one previously described is the reversed position of the drive roller and the springs. In this embodiment, a pair of spaced drive rollers 12' are secured to the drive shaft and the film supporting spool 15' is interposed therebetween in encircling arrangement. The spiral spring 28' is interposed between the shaft and the inner periphery or inner peripheral surface of the spool rim 16'.

In the operation of this invention, the film is normally pulled from the processor at a constant travel speed by a pacer roll, and the tension in the film is normally established by the force required to pull the film. Normally, the spool 15 is free to rotate on shaft 10 at a speed determined by the film in contact therewith. As tension is increased beyond a predetermined amount, such as due to the shrinkage of the film by the processing, the frictional force between the drive shaft and the central hub portion 26 of the support spool 15, the amount of torque required to transport the film, or other dynamic factors, one or more spools 15 are deflected by the film against the force of spiral spring 28 until the surface 18 of the rim portion 16 is moved into driving engagement with the respective drive roller 12. The drive roller then drives the spool, and the film in engagement therewith, faster than the normal film travel speed causing the following film loop to lengthen, which in turn reduces the film tension and releases the contact between the drive roller 12 and spool 16. This clutching-declutching action between the spool and drive roller will occur repetitively and progressively through the processor at a relatively high frequency and with very small radial travel of the film support spool until sufficient correction is made for the increased film tension.

It will be noted that the tension in the web or film transport system of the present invention may be maintained within closely defined limits since the amount of deflection necessary to cause the film speed to increase, reducing tension, is relatively small. Likewise, the mass of the spool to be deflected is so small that little or no film stretching is encountered. Moreover, it will be seen that local variations in tension can be readily accommodated without imposing undesirable loads upon the remainder of the system. Also, the radius of the bends in the film is not changed as the spools are deflected since the rim is substantially rigid and has a substantially constant diameter. As a result the web is not subjected to smaller radius turns which could possibly result in film breakage.

All of the foregoing advantages are accomplished with the arrangement of the present invention while at the same time the complexity and size of the entire system is substantially reduced due to the fact that a separate drive shaft is not necesary for selectively driving the web support spools.

While the present invention has been illustrated with respect to a photographic processor, it will be appreciated that it may be advantageously applied to many other web transport systems requiring the same close tension control provided thereby.

The invention has been described in detail with particular reference to preferred embodiments thereof, but it will be understood that variations and modifications can be effected within the spirit and scope of the invention as described hereinabove and as defined in the appended claims.

I claim:

1. A web transport system comprising a shaft having a drive member mounted thereon; a web support spool arranged for rotation about said shaft and comprising a substantially rigid central hub portion disposed substantially coaxial with said shaft and arranged to rotate thereabout adjacent said drive member, a substantially rigid constant diameter rim portion disposed about and having a larger diameter than said hub, said rim portion being arranged to encircle said drive member, at least one flexible member connecting said rim portion to said hub portion whereby said rim portion may rotate about said shaft at varying radial distances; said support spool being normally disposed in radial spaced relation to said web drive member whereby said support spool rotates independently of said shaft and said drive member until said rim portion is deflected into contact with said drive member.

2. A web transport system according to claim 1 wherein the flexible member has a generally involute shape.

3. A web transport system according to claim 1 wherein the support spool includes at least a pair of flexible members one disposed axially on each side of said drive member.

4. A web transport system according to claim 1 wherein a pair of drive members are disposed on said shaft one on each side of said hub.

5. A film processor system comprising at least one processing tank; a first shaft disposed in the upper portion of said tank; a second shaft disposed in the lower portion of said tank; a plurality of film support spools arranged for rotation about said shafts; at least one of said support spools comprising a substantially rigid central hub portion disposed substantially coaxial with its related shaft and arranged to rotate thereabout, a substantially rigid constant diameter rim portion disposed about and having a larger diameter than said hub, at least one flexible member connecting said rim portion to said hub portion whereby said rim portion may rotate about said hub at varying radial distances; a drive roller connected to and driven by the shaft containing said variable radius support spool; said support spool being normally disposed in radial spaced relation to said drive roller; said drive roller arranged to drive said variable radius support spool upon deflection of said rim portion by film passing thereover.

References Cited

UNITED STATES PATENTS

| 2,120,735 | 6/1938 | Debrie | 226—191 |
| 2,701,717 | 2/1955 | Morrill | 242—55.01 |
| 2,728,530 | 12/1955 | Goldberg et al. | 242—55.14 |
| 2,854,197 | 9/1958 | MacNeill | 242—55.12 |

LEONARD D. CHRISTIAN, *Primary Examiner.*